United States Patent [19]

Bormioli

[11] 4,138,149
[45] Feb. 6, 1979

[54] PIPE ELEMENT WITH A TERMINAL HYDRAULIC SEAL COMPRISING A DIFFERENTIAL MOBILE MEMBER

[76] Inventor: Giorgio Bormioli, via Galileo Galilei, 21, Padova, Italy

[21] Appl. No.: 811,087

[22] Filed: Jun. 29, 1977

[30] Foreign Application Priority Data

Jul. 6, 1976 [IT] Italy .................. 25059 A/76

[51] Int. Cl.$^2$ ............................................. F16L 23/00
[52] U.S. Cl. .................................. 285/320; 285/362; 285/375
[58] Field of Search .............. 285/375, 362, 320, 311, 285/310, 351, 370

[56] References Cited

U.S. PATENT DOCUMENTS

| 426,824 | 4/1890 | Leland | 285/311 X |
|---|---|---|---|
| 1,117,762 | 11/1914 | Barcus | 285/375 X |
| 2,696,993 | 12/1954 | Buckler | 285/375 X |
| 2,700,559 | 1/1955 | Jensen | 285/375 X |
| 3,558,161 | 1/1971 | Bormioli | 285/320 X |
| 3,649,052 | 3/1972 | Snyder, Jr. | 285/362 X |
| 3,899,199 | 8/1975 | Garey | 285/375 X |

FOREIGN PATENT DOCUMENTS 960436  3/1957  Fed. Rep. of Germany .......... 285/311

Primary Examiner—Thomas F. Callaghan
Attorney, Agent, or Firm—Shlesinger, Fitzsimmons & Shlesinger

[57] ABSTRACT

This invention relates to a pipe element designed for rapid connection to a pipe provided with a thermal flange, and provided with new terminal hydraulic seal means which ensure a perfect durable hydraulic seal in the connection region. Said seal means comprise an axially slidable tubular member provided with an inwardly facing terminal flange and having a first annular gasket of greater diameter disposed around said tubular member and a second annular gasket of smaller diameter disposed on the front of said terminal flange of the tubular member. Resilient thrust means are arranged to urge said tubular member into a state of tight engagement of its terminal flange with the terminal flange of the pipe to which the pipe element is connected.

1 Claim, 2 Drawing Figures

PIPE ELEMENT WITH A TERMINAL HYDRAULIC SEAL COMPRISING A DIFFERENTIAL MOBILE MEMBER

This invention relates to a pipe element designed for rapid connection to a pipe provided with a terminal flange, and provided with new terminal hydraulic seal means which ensure a perfect durable hydraulic seal in the connection region.

Normally, when two pipes or pipe elements are connected by rapid connection means, the hydraulic seal in the connection region is entrusted to an annular gasket interposed and clamped between two abutting terminal flanges of the two pipes. This traditional seal system has the disadvantage of giving rise to a dangerous lessening of the seal should the members locking the two abutting flanges undergo slight yielding or, where said locking members comprise the use of resilient thrust elements, even one of the two flanges is of slightly lesser thickness than the thickness for which the locking members, and in particular their resilient thrust elements, have been designed (this is the case for example in the rapid connector for pipes described in Italian Pat. No. 844.387).

Furthermore, during use, the pressure of the fluid product passed through the pipes exerts a separation thrust on the two abutting flanges which tends to annul the hydraulic seal. On this basis, the object of the present invention is to provide a pipe element using a new seal element which, when made to act by connecting the tube element to a tube or a further tube element provided with a flange, not only is not influenced by any yielding of the locking members or of small variations in the flange thickness, but instead during operation utilises the pressure of the fluid product passing through it to increase, rather than reduce the degree of seal.

According to the invention, this object is attained by a tube element, comprising essentially a terminal hydraulic seal element constituted by a tubular member disposed coaxially inside said pipe element in an axially slidable manner, said tubular member being provided with a terminal flange facing inwards and arranged to abut against the terminal flange of the pipe to which said pipe element is to be connected, and having associated therewith a first annular gasket of greater diameter disposed about said tubular member so as to make fluid-tight engagement with the surrounding inner wall of said pipe element, and a second annular gasket of smaller diameter disposed on the front of said terminal flange of said tubular member so as to make fluid-tight engagement with the facing terminal flange of said pipe, there being provided resilient thrust means arranged to urge said tubular member into a state of tight engagement of its terminal flange with the terminal flange of said pipe at the moment in which said pipe element becomes connected to said pipe.

In other words, the pipe element according to the invention is based substantially on the use of a hydraulic seal element in the form of a mobile member which is given different behaviour characteristics towards the pressure of the conveyed fluid product by two gaskets of different diameters. In this respect, once the connection has been made and the resilient thrust means have caused the initial tight engagement between the terminal flange of the mobile tubular member and the terminal flange of the pipe being connected, the fact that the diameter of the gasket disposed about the tubular member is greater than the diameter of the gasket disposed on the front of its terminal flange means that the pressure of the fluid product acts on a greater area in the seal direction and on a smaller area in the opposite direction. This provides a force favouring the seal which is greater than the force tending to annul it, and thus enables the pressure of the fluid product to contribute towards maintaining the best seal conditions by compensating any yielding of the locking members or any variation in thickness of the flange of the pipe to which the pipe element according to the invention is connected. It is evident that it represents an extremely simple seal system.

The characteristics and advantages of the pipe element according to the invention will be more evident from the detailed description given hereinafter of two possible embodiments illustrated by way of example in the accompanying drawings in which.

Figure 1:
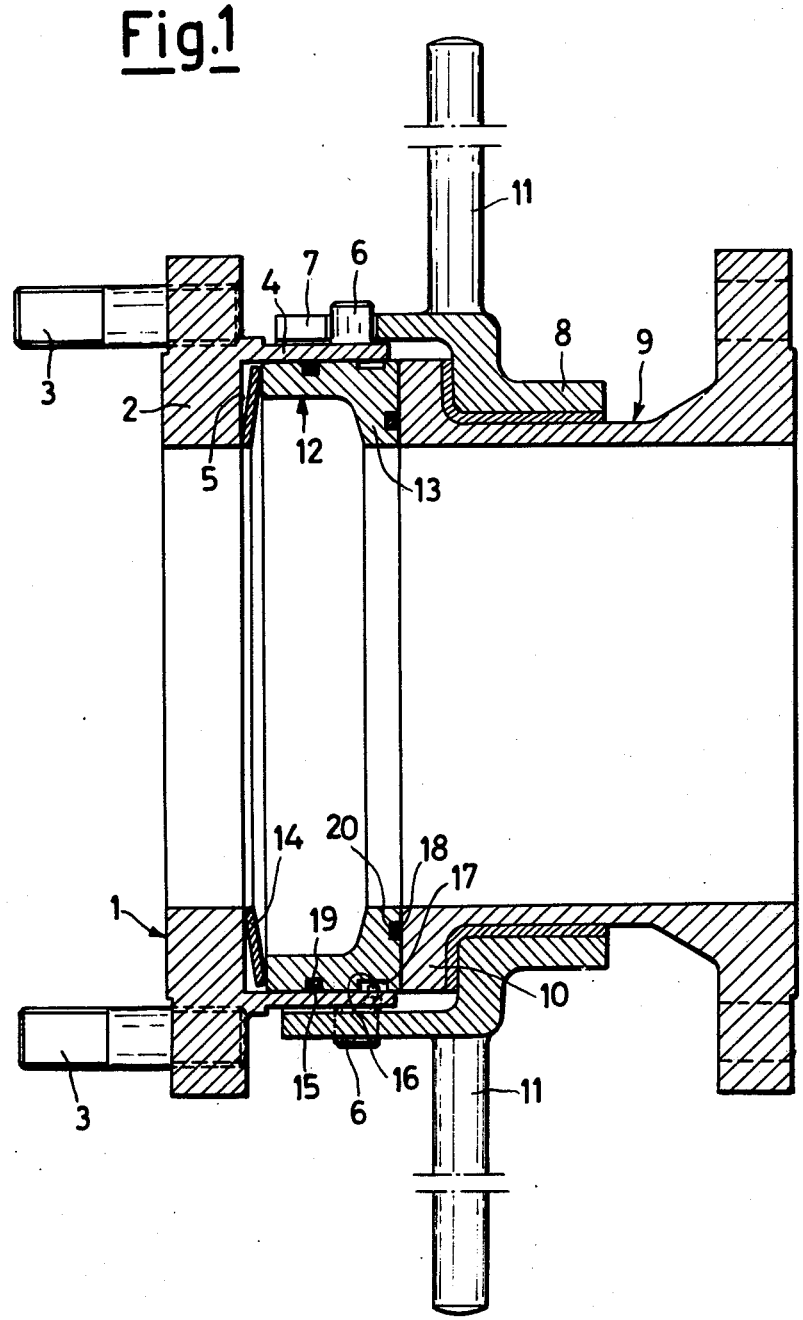
FIG. 1 is an axial section through a pipe element according to the invention suitable for bayonet connection to a flanged pipe.

The pipe element shown in FIG. 1, in which it is indicated with the reference numeral 1, comprises a rear part of smaller inner diameter 2, designed for connection by known traditional means such as screws 3 to further pipe elements not shown on the drawing, and a front part of greater inner diameter 4 connected to the rear part 2 by an annular shoulder 5.

The outer wall of the front part 4 is provided with suitable radial projections 6 arranged to make bayonet locking engagement with respective radial apertures 7 in a rotatable tubular member 8 carried by a pipe 9 provided with a terminal flange 10, to which the pipe element 1 is to be connected. The rapid connection is made and locked by bayonet insertion, by engaging the projections 6 in the apertures 7 and rotating the rotatable tubular member 8 using operating rods 11.

In order to provide the hydraulic seal between the pipe element 1 and pipe 9 in addition to the mechanical connection, inside the front part 4 of the pipe element 1 there is coaxially disposed an axially slidable seal element composed of a tubular member 12 provided with a laterally inwardly projecting terminal flange 13 of reduced external diameter facing inwards and arranged to abut against the terminal flange 10 of the pipe 9 under the thrust of a Belleville spring 14 acting against the annular shoulder 5. A screw 16 carried by the pipe element 1 and slidably housed in an annular cavity 17 in the tubular member 12 limits the possibility of axial movement of the tubular member 12.

Figure 2:
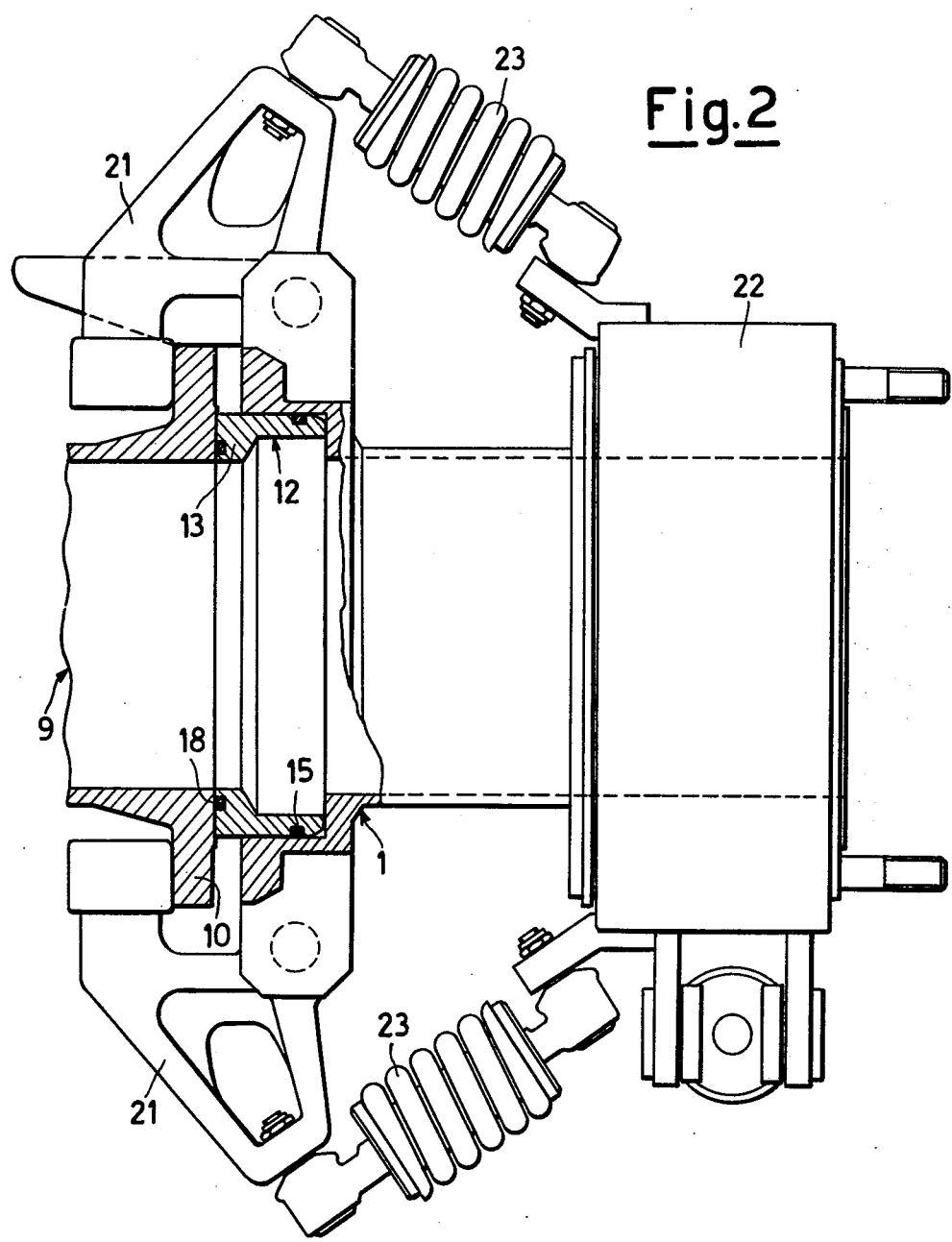
FIG. 2 is a partial axial section through a further pipe element according to the invention, suitable in this case for rapid coupling to a flanged pipe using gripping jaws.

Two annular gaskets 15 and 18 are associated with the tubular member 12, the first of these, of greater diameter, being disposed about the tubular member 12 in an annular cavity 19 to make fluid-tight engagement with the surrounding inner wall of the front part 4 of the pipe element, while the second, of smaller diameter, is disposed on the front of the terminal flange 13 in an annular cavity 20 in this latter, and is thus arranged to make fluid-tight engagement with the facing terminal flange 10 of the pipe 9. The tight engagement between the flanges 13 and 10 is initially effected with the aid of the gasket 18 at the moment of rapid connection by means of the elastic thrust exerted by the Belleville spring 14, and said engagement is then improved and made more reliable and durable by the fluid product passing through the two coupled pipes during use. In this respect, because of the different internal diameters of the two portions of member 12 housing the gaskets 15 and 18, respectively, the pressure of the fluid product acts on a greater area in a direction which favours the seal (towards the right with reference to FIG. 1) and on a smaller area in the opposite direction. Because of the differential effect, this determines a resultant force which urges the tubular member 12 towards the terminal flange 10 of the pipe 9, so reinforcing the hydraulic seal provided by the gasket 18 interposed between the flanges 13 and 10. A conceptually analogous pipe element is shown in FIG. 2, in which equal reference numerals indicated parts or elements corresponding to those of FIG. 1, and in which a rapid coupling device of the type described in Italian Pat. No. 844.387 is associated with the pipe element 1 and comprises rotatable jaws 21 made to close and open by a rotatable thrust block 22 by means of positionable rods 23 of elastically variable length.

The only appreciable difference is the fact that the Belleville spring 14 is missing. This is because the elastic rods 23 provide the elastic thrust necessary for initially effecting the tight engagement between the internal flange 13 of the mobile tubular member 12 and the external flange 10 of the pipe 9.

It should be noted that in this case any variations in thickness of the flange 10 which could lessen the loading of the springs of the elastic rods 23 after closing the jaws 21 are compensated and corrected during operation by the pressure of the conveyed fluid product against flange 13, which in the manner already described thrusts the mobile member 12 towards the left (with reference to FIG. 2) to move the mobile member and thus the pipe 9 by the necessary amount to restore the required loading to the springs of the elastic rods 23.

What we claim is

1. In a pipe element designed for rapid connection to a pipe provided with a terminal, external flange, said pipe element being provided with a rapid connecting device including a plurality of rotatable gripping members and corresponding plurality of rods of elastically variable length adapted to cause the closure of said gripping members, the improvement comprising
   a tubular hydraulic seal member disposed coaxially inside a counterbore in one end of said pipe element for unencumbered axial sliding movement into and out of an innermost position in which said member is engaged at its inner end against the bottom of said counterbore, and for unencumbered axial sliding movement out of the open end of said counterbore, when said pipe element is disconnected from said pipe,
   said tubular member having an outer end extending out of said pipe element and having on said outer end a terminal, internal flange arranged to abut against the terminal external flange on said pipe to which the pipe element is to be connected,
   a first annular gasket surrounding said tubular member and disposed to have fluid-tight engagement with the surrounding inner wall of said pipe element in which said tubular member is axially slidable, and
   a second annular gasket, having a diameter smaller than the diameter of said first gasket, and mounted in an annular recess in the end face of said internal flange on said outer end of said tubular member for fluid-tight engagement with the confronting surface on the external flange of said pipe,
   said gripping means being arranged to thrust said external flange of said pipe into abutting engagement with said internal flange on said tubular member thereby to effect said fluid-tight engagement of said second gasket with the confronting face of said external flange on said pipe.

* * * * *